UNITED STATES PATENT OFFICE.

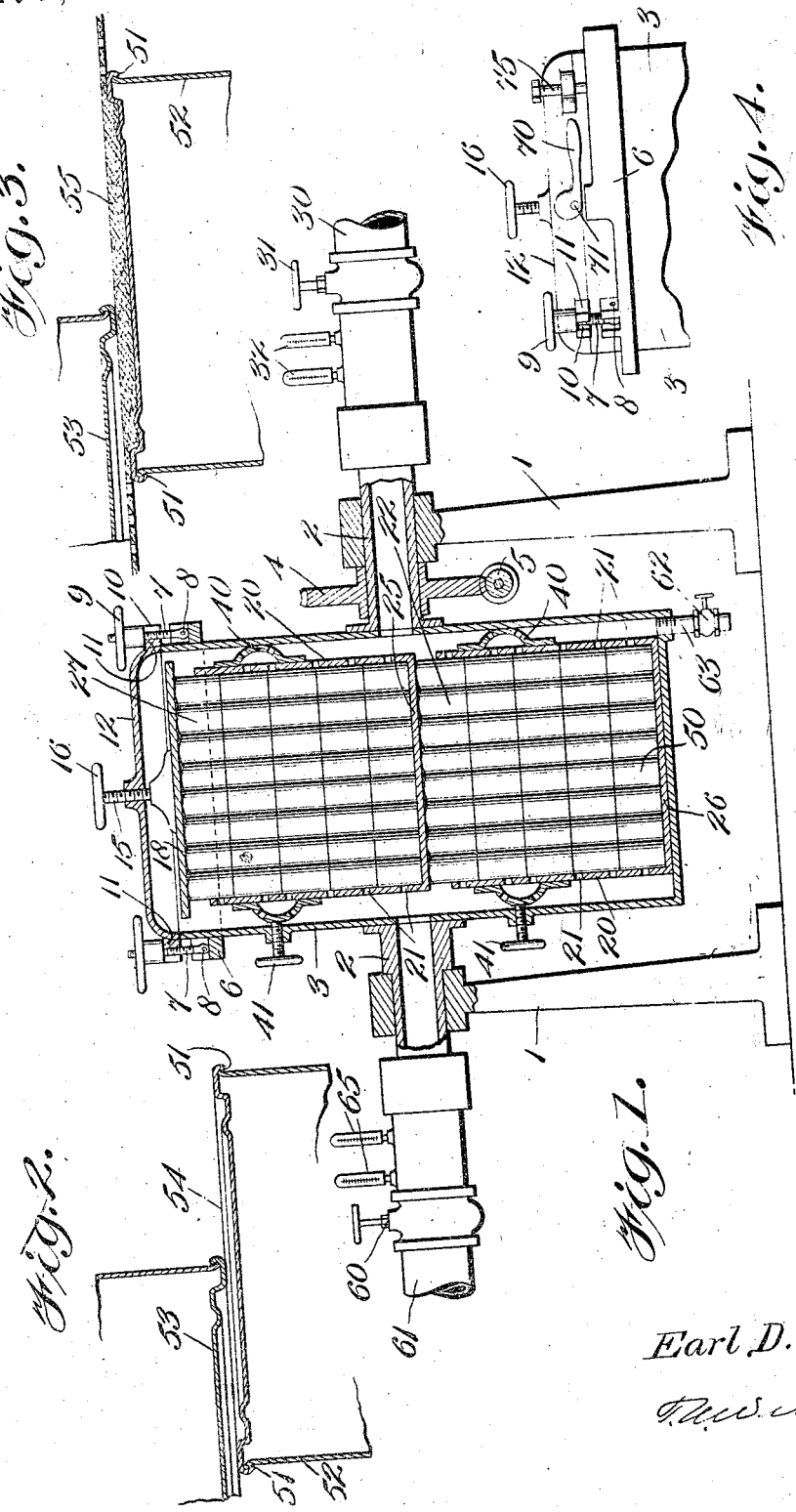

EARL D. SMITH, OF DELPHI, INDIANA.

APPARATUS FOR PROCESSING FOOD PRODUCTS.

1,174,189.   Specification of Letters Patent.   Patented Mar. 7, 1916.

Application filed October 25, 1915. Serial No. 57,872.

*To all whom it may concern:*

Be it known that I, EARL D. SMITH, a citizen of the United States, residing at Delphi, in the county of Carroll and State of Indiana, have invented certain new and useful Improvements in Apparatus for Processing Food Products; and I do hereby declare the following to be a full, clear, and exact description of the invention, such as will enable others skilled in the art to which it appertains to make and use the same.

This invention relates to an apparatus for processing vegetables and other food products, and has for its object to provide a means for accomplishing this result which will be comparatively inexpensive to construct, and less costly and more efficient in operation than those which have been heretofore proposed.

With these and other objects in view the invention consists in the novel details of construction and combination of parts more fully hereinafter disclosed and particularly pointed out in the claims.

Referring to the accompanying drawings forming a part of this specification, in which like numerals designate like parts in all the views—Figure 1 is a diagrammatic partly sectional view of an apparatus made in accordance with my invention; Fig. 2 is an enlarged detail sectional view of portions of a pair of cans showing how the bottom of one can tends to hold tight the top of another can and thereby prevent the cans from leaking during the processing operation; Fig. 3 is a view similar to Fig 2 but showing a packing between the tiers of cans; and Fig. 4 is a diagrammatic elevational view of the processing apparatus showing the closure for the same and the cam lever to facilitate the lifting or unlocking of the closure when it is desired to remove the cans.

1 indicates any suitable bearings or supports, 2 hollow trunnions journaled in said bearings, 3 a retort or container rigid with the trunnions 2, 4 a worm or other gear rigid with one of the said trunnions 2, 5 a worm or other means for driving the gear 4 and rotating the said trunnions and container 3. Suitably secured to the container 3 as by the rings or lugs 6 are the closure securing members 7 preferably consisting of screw-threaded rods hinged as at 8 and provided with the hand wheels or nuts 9. The said rods 7 conveniently enter the slots 10 with which the lugs 11 secured to the closure 12 are provided, and the nuts or other means 9 are adapted to screw down firmly onto the said lugs 11 and thereupon hold the closure 12 firmly against the edges of the container 3, which may be provided with any suitable packing not shown.

Passing through the closure 12 gas tight, is the screw 15, provided with a hand wheel 16 and secured to its lower end is the pressure disk 18, all as will be clear from the drawings.

Located on the interior of the retort or outer container 3 are the crates or other vessels 20 preferably provided with the perforations 21 and adapted to receive a plurality of layers or rows of cans 22. The upper layer of cans 22 is caused to project somewhat above the upper edge of the lower crate as shown, so that the bottom 25 of the upper crate 20 may rest firmly on the tops of the cans 22 and cause each layer of cans to be pressed firmly against the next lower layer and the lower layer 50 of cans to be pressed firmly against the bottom 26 of the lower crate 20. In like manner the upper layer 27 of cans projects somewhat above the upper edge of the upper crate 20 and receives pressure from the disk 18 when the said screw 15 is set up by means of the hand wheel 16. It results from the disposition of parts just stated that when the screw 15 is thus set up and the disk 18 thus pressed down firmly on the tops of the upper rows of cans 27 that all of the cans in the crates 20 are firmly pressed against each other so that the bottoms of one row of cans rest firmly upon the tops of the next succeeding row of cans and it further results that the cans and crates are held firmly in the outer vessel 3 so that they cannot move out of place when the said outer vessel 3 is rotated.

Steam, as well as cold water may be introduced through the pipe 30 and controlled by the valve 31. Thermometers such as 32 will show at all times the temperature of the steam or cold water, and when steam is introduced it will enter the perforations 21 in the crates and heat the contents of the cans up to the desired degree. In the meantime power may be delivered through the worm 5 to the worm wheel 4, and the outer retort 3, as well as the crates and the cans may be continuously rotated.

In order that the parts may be the more firmly held inside of the retort 3 there may be provided on the outside of the crates the convex rings or other members 40 against which take the screws 41 passing gas tight through the outer retort 3, and serving to press the said rings firmly up against the inside walls of the outer container 3 and thus more firmly hold the crates in place.

It is well known in the processing of food that it is a matter of considerable importance to heat thoroughly the interior of the contents of each can, because if the center portions of the said contents are not heated sufficiently high to sterilize or pasteurize the same, the said contents are liable to later spoil. On the other hand, it is further well known that when the contents of the cans are ordinarily processed and sufficient temperature is applied to the exterior thereof to thoroughly heat the interior throughout its mass, the outer layers of the food may be overcooked, discolored, its flavor impaired or other injuries may result. It is therefore very desirable indeed to use the minimum temperature for heating the outer layers of the contents of the can that will insure a thorough sterilization of the center portions of the contents.

Heretofore in order to overcome the above defects, the cans have been rolled or moved on or around their longitudinal axis, the said axis being held in a horizontal position substantially throughout the rolling or agitating action. This agitation of the contents of the cans was found to be a decided improvement over the processing of their contents while stationary, but it was yet found to be insufficient to overcome all of the above objections and especially when it is remembered that the higher the temperature to which the contents of the can is subjected the more will be the destruction of the flavor. Accordingly, an important feature of the present invention resides in the fact that the cans are not agitated or rotated around their horizontal axes, but the cans are revolved around the horizontal axis of the outer retort 3, so that their contents are given a reciprocating motion longitudinally of the axis of each can. By imparting to the contents of the cans this said reciprocating motion along the axis of each can, gravity serves to pull the contents in one direction when a half revolution of the retort 3 is had and to pull the same contents in the opposite direction when another half revolution is had. This action of gravity permits the fluid and gaseous contents of the can to rise to the top when it is in one position and to pass up through the solid contents of the can to reach what is then the top when the cans are in their other position, so that not only are the contents of the can given a reciprocating motion longitudinally of its axis, but the said contents are subjected to a sort of reciprocating churning action owing to the above movements of the liquid and gaseous contents.

It results from the churning action of the contents of each can above described, that the said contents are uniformly heated throughout their mass so that a minimum temperature may be applied to the exterior of each can in order to effect a complete and thorough sterilizing action. It therefore results that by employing this said churning action on the contents of the can I am enabled to preserve a better color and flavor of the food products for a given sterilization than it would be possible to do without said churning action.

It is further a common objection in the art of processing food products, that the steam or gas generated on the inside of the can bulges the ends of the can outward during the processing of said products, and the strain of this bulging action of necessity must be resisted by the joint such as 51 between the closures of the can and its body portion. These strains often give rise to leaks, and as a result heavy losses of the contents of the cans are experienced. According to my process on the other hand, the bottom of each can such as 53 rests upon the top rim 54 of a succeeding can, and thereby resists these said strains and consequently greatly aids in preventing the seams 51 from opening. In some cases where the said seams 51 are of a character not calculated to withstand severe strains, a packing 55 of asbestos or other suitable material may be inserted between the bottoms 53 of the cans and the tops of succeeding cans, so that a more effectual resistance may be had, but such packing will not ordinarily be found necessary.

After steam has been admitted to the interior of the retort 3 through the pipe 30 as disclosed above, and after the proper temperature has been attained as indicated on the thermometers 32, and after the proper time allotted to the particular food being processed has passed, the valve 60 may be opened and the steam allowed to escape through the pipe 61. When desired, the valve 62 may be also opened and the retort 3 drained through the pipe 63. The retort 3 being thus emptied of its steam, cold water may be admitted through the pipe 30 and hollow trunnion, and allowed to escape through the pipe 61, whereupon the thermometers 65 and 32 will indicate the temperature to which the cans have been lowered.

The contents of the cans having been heated while moved longitudinally of their axes in the manner above disclosed, for predetermined times and the said contents having been cooled to the desired temperature by the application of cold water as disclosed above, the screw 15 may be turned in an opposite direction so that the pressure disk 18 is moved out of contact from the upper layer of cans 27. The nuts 9 may now be loosened and the rods 7 swung on their pivots 8, whereupon the cam lever 70 may be turned on its pivot 71 and the cover 12 forcibly raised from the upper edge of the retort 3. The said cover may next be swung around upon any convenient hinge device such as 75 and the cans suitably removed from the retort 3.

It is obvious that those skilled in the art may vary the details of construction, without departing from the spirit of the invention and therefore I do not wish to be limited to the above disclosure except as may be required by the claims.

What I claim is:

1. In an apparatus for processing food products in cans; the combination of a retort having hollow trunnions attached to opposite sides of said retort; a closure for one end of said retort; a pressure means carried by said end adapted to contact with the ends of the cans being treated and to hold them firmly in place; a container for said cans located in said retort having one end open, and of such a length as to cause cans placed endwise therein to project beyond said open end in order that said pressure means may directly contact with said cans; means connected to said trunnions for rotating said retort and revolving said cans sidewise around said trunnions as an axis and thereby causing the can contents to reciprocate axially of said cans at each revolution; and means for admitting a heating fluid to said cans through said hollow trunnions while their contents are thus moving, substantially as described.

2. In an apparatus for processing food products in cans, the combination of a retort provided with hollow trunnions affording a communication from the exterior to the interior of said retort; means for rotating the ends of said retort around the said trunnions as an axis; means for admitting steam and cold water at different times to the interior of said retort through said hollow trunnions; means for closing one of the rotating ends of said retort; a crate-like container adapted to hold the cans to be treated with their ends parallel to the rotating ends of the retort and located on the interior of said retort, the dimensions of said container being such as to cause some of the cans to project beyond the walls of said container; and means carried by said closing means adapted to exert endwise pressure on all of the cans being treated while said retort is being revolved, whereby said cans are held firmly in position while their contents receive an axial reciprocating motion, substantially as described.

3. In an apparatus for processing food products in cans, the combination of a retort provided with hollow trunnions affording a communication from the exterior to the interior of said retort; means for rotating said retort on the axis of said trunnions; means for admitting steam and cold water at different times to the interior of said retort through said hollow trunnions; means for closing said retort; a plurality of crate-like containers placed end to end adapted to hold the cans to be treated with their axes perpendicular to a plane passing through said trunnions and located on the interior of said retort; the dimensions of each container being such that some of the cans in each project beyond its walls; a closure for said retort; means acting on said crate-like means for firmly holding the latter inside said retort; means carried by said closure to exert endwise pressure on the projecting cans and on the end seams of all of the cans being treated while said retort is being revolved, whereby the contents of said cans are given a reciprocating motion at each revolution; and means to firmly hold each crate-like means against sidewise movement in said retort, substantially as described.

In testimony whereof I affix my signature, in presence of two witnesses.

EARL D. SMITH.

Witnesses:
JOHN H. CARTWRIGHT,
THOMAS E. MOLIA.